US005421687A

United States Patent [19]

Wayman

[11] Patent Number: 5,421,687

[45] Date of Patent: Jun. 6, 1995

[54] SELF LOADING-UNLOADING CONTAINER TRAIN AND POWER CONTROL UNIT

[75] Inventor: Robert W. Wayman, 22481 Tindaya, Mission Viejo, Calif. 92692

[73] Assignees: Robert W. Wayman; Laurine Wayman, both of Mission Viejo, Calif. ; Trustees of the Robert W. Wayman and Laurine Wayman Family Trust

[21] Appl. No.: 198,047

[22] Filed: Feb. 16, 1994

[51] Int. Cl.$^6$ .............................................. B61K 1/00

[52] U.S. Cl. .................................. 414/339; 414/352; 414/345

[58] Field of Search ............... 414/339, 333, 340, 345, 414/352, 353

[56] References Cited

U.S. PATENT DOCUMENTS

| | | | |
|---|---|---|---|
| 426,385 | 4/1890 | Jones . | |
| 1,275,145 | 8/1918 | Fitch . | |
| 1,772,939 | 8/1930 | Fitch . | |
| 1,843,988 | 2/1932 | Randall . | |
| 2,103,751 | 12/1937 | Kellett . | |
| 2,223,275 | 11/1940 | Valenzuela . | |
| 2,304,418 | 12/1942 | McMurry . | |
| 2,703,659 | 3/1955 | Hutchins . | |
| 2,831,588 | 4/1958 | Seed . | |
| 2,950,690 | 8/1960 | Bohlen . | |
| 3,002,636 | 10/1961 | Felburn . | |
| 3,028,023 | 4/1962 | Eckersall | 214/38 |
| 3,050,168 | 8/1962 | Kemp | 194/10 |
| 3,059,592 | 10/1962 | Cozzoli . | |
| 3,143,979 | 8/1964 | Eckersall | 105/455 |
| 3,144,838 | 8/1964 | Shaver et al. | 105/366 |
| 3,232,242 | 2/1966 | Krueger | 105/366 |
| 3,416,684 | 12/1968 | Barry . | |
| 3,991,889 | 11/1976 | Cox | 214/38 |
| 4,065,006 | 12/1977 | Barry | 214/42 |
| 4,792,269 | 12/1988 | Engle | 410/80 X |

OTHER PUBLICATIONS

Article entitled Freight Train of the Future: The Integral Train from Oct. 1985 issue of Mechanical Engineering Magazine, by Thomas H. Engle.

Article entitled Side Loaders Transfer Containers from Apr., 1963 issue of Modern Railroads Magazine.

Article entitled Integral Train Systems by John G. Kneiling, M.E., P.E., Consulting Engineer, 1969, published by Kalmbach, Milwaukee, Wis.

*Primary Examiner*—Frank E. Werner
*Assistant Examiner*—James Eller
*Attorney, Agent, or Firm*—Stetina Brunda & Buyan

[57] ABSTRACT

This invention covers self loading-unloading of containers or pallets in a lateral motion, avoiding lifting, applying particularly to rail cars, trucks, and fixed platforms. The railway embodiment includes a central power control unit, unique platform cars with gripper-equipped arms, and scanning devices for monitoring operation plus reading indicia on the containers. The crew in the power control unit, which includes a novel driving arrangement, operates the train and the on-off loading equipment, either manually or automatically, remotely. By integration with similarly equipped trucks, freight handling can be fast, shock-free, door-to-door, and superior to existing modes.

34 Claims, 14 Drawing Sheets

SELF LOADING-UNLOADING CONTAINER TRAIN AND POWER CONTROL UNIT

FIELD OF THE INVENTION

Covered generally is the automatic or self on-and-off loading of containers or pallets in a lateral or side motion, avoiding lifting, and applying to rail cars, fixed platforms, and trucks or road vehicles. More specifically addressed is a rail transport train comprising a centrally located power control unit, unique platform cars, and end cabs. The cars include gripper-equipped arms, scanning devices, and fluid or electrical actuation to achieve remote automatic or manual cargo loading or unloading. Further, a unique power application or drive-train arrangement is included in the power control unit for providing motive power to the train.

BACKGROUND OF THE INVENTION

During most of the 20th century, railroads have been losing freight business to other forms of transportation such that some railway transport businesses have failed, thousands of miles of track abandoned, train car building curtailed and employment diminished. Efforts to retain or increase the volume of railway freight hauling include containerization, unit trains, trailer on flat car (TOFC or piggy-backing) and trailer trains, all of which are evident to the observer. While many of these efforts are considered advances in railway transport, the disadvantages associated with such efforts allow trucks with or without trailers to continue to erode railways' business by providing superior service.

Analysis of current and prior art railway systems reveals that a variety of problems including excessive handling of shipments results in one or more of the following: Delays, slowness and uncertainty; split responsibilities; untraceability of en route shipments; damage to cargo; difficulty of making claims; lack of door-door pickup and delivery by one carrier and on a timely basis; necessity for extra packaging of fragile items; difficulty of shipping items which must be heated, cooled or frozen; inability to accommodate short distance shipments economically; difficulty of servicing small towns or city suburbs directly; oftentimes requirements to couple and uncouple cars with resultant shunting and shock; and use of marshalling yards to"make up" trains by means of "humping", an extremely severe operation causing excessive shock to the cargo and equipment.

As further background, refer to U.S. Patent No. 2,304,418 issued to Murry entitled TRANSPORTATION EQUIPMENT, U.S. Pat. No. 2,950,690 issued to Bohlen entitled FREIGHT HANDLING SYSTEM, U.S. Pat. No. 3,232,242 issued to Krueger entitled SIDE TRANSFER FOR TRAILERS, U.S. Pat. No. 3,991,889 issued to Cox entitled RAILWAY TRANSPORT SYSTEM AND APPARATUS THEREFOR and U.S. Pat. No. 4,065,006 issued to Barry entitled CONTAINER SIDE-TRANSFER SYSTEM. Also refer to book entitled"INTEGRAL TRAIN SYSTEMS", by John G. Kneiling, and MECHANICAL ENGINEERING MAGAZINE, October '85 issue.

The disadvantages of the prior art railway systems in combination with the availability of a transportation system having its own rights-of-way unencumbered with unrelated traffic, created the interest in and is the reason for the present invention.

SUMMARY OF THE INVENTION

The overall concept consists of a unique train of platform cars arranged with a power control unit in the center, of short length, on the order of ten load-carrying cars and with identical end units each fitted with a small cab. The payload comprises currently used containers, or special types, both of which can utilize the benefits provided, among which are provisions for electric power, smooth riding characteristics and shock-free handling.

A crew of one person, or more, operates from the central power control unit, selecting the train's mode of operation and performing container loading-unloading via remote controls utilizing fast side loading means. Closed circuit TV cameras in the end cabs provide fore and aft vision for the centrally located crew so that the train can be operated manually or automatically, remotely.

Side loading is performed on to or off of either side of the train to similarly equipped trains, trucks, or to stationary platforms for further transfer, either to vehicles or conveyor-type equipment. Via addressed or bar-coded containers, the crew is able to monitor each container from on-load to off-load and thus provide billing information immediately, greatly simplifying the charging for services.

Containers are supported by a multiplicity of non-swivel type casters fixed to the frames of the platform car, truck, or stationary platform. Any container position on the train call be matched to an identical position on an adjacent train, truck, or stationary platform via an "inching" device for horizontal positioning and via air-springs for vertical positioning, more fully described below. Once lined up, containers can be loaded or unloaded via drawer-slide types of devices fitted with clamps or grippers and actuated remotely, more fully described below, including the anchoring of the containers.

For shipments requiring heating, refrigeration, or ventilation, special containers equipped to receive electrical power are provided. A sliding connector on the underside of such containers engages a matching connector on the train, truck, or fixed platform (rack) and which is connected to an electrical power source.

Handling of standard 20- and 40-foot long containers is envisioned, but, with minor changes, others such as 28-, 45-, and 48-foot lengths can be accommodated. Handling a longer pallet or container, such as one 80 feet long for example, is possible by coordinating two adjacent 40-foot stations. The cargo container may additionally comprise a cage.

The major objective or purpose of the invention is to provide minimal handling of shipments in such a manner so as to overcome the difficulties associated with the prior art.

Further purposes of the present invention include but are not limited to the following:

a. Utilization of existing standard containers of various lengths with little or no alterations;

b. Movement of cargo with equal or less shock than current truck transport;

c. Allowance of direct container transfer train to/from truck, train to/from train, train to/from a fixed platform, truck to/from truck, and truck to/from a fixed platform, all via side loading;

d. Provision for fast pickup of containers as unloaded from ships to avoid present delays in handling;

e. Obsolescence of marshalling yards, humping, and large, mostly static, train yards along with container-lifting equipment;
f. Instigation of sidings and loading-unloading platforms of various designs suitable for the area, town, or city;
g. Provision for electric power on trains, trucks, and platforms so that properly equipped containers can connect, thereby allowing heating, cooling, ventilation, illumination, mixing, handling, or refrigeration of the cargo;
h. With electricity available, a passenger carrying pod is possible. This would be similar to those in use at Dulles International Airport, Washington, D.C. The pod could be unloaded to a truck and act in the capacity of a bus. The pod could become a city-to-aircraft transporter, by-passing the air terminal, and loading directly to the aircraft, thus relieving airport congestion;
i. Modification of aircraft containers to fit the train-truck handling mechanism would allow fast ground transport of air cargo;
j. Use of bar-coded information or written address provided by the shipper and placed in a fixed position on the container;
k. Provision for the application of motive power to move the train as required;
l. Provision of adequate means to control the movement of the train both remotely, manually, and automatically, i.e., without the attention of a driver;
m. A combination of electric, electronic, and fluid means to actuate remotely mechanical means to on- and off-load containers or pallets to and from multiple container cars, and/or trucks or fixed platforms;
n. Multiple communication means, such as telephone and radio, for on-board, off-board, and computer-to-computer message transmission;

Additional aims and features consist of the crew's quarters and control cab on two levels of the power control units; dual controls, engines, and accessories for reliability and for operation of the train equally well in either direction; replacement of the usual diesel-electric power system by internal combustion engines connected to the driving wheels by unique drive trains; slackless couplers; monitoring and control via closed circuit TV; self-contained rapid-fill fuel tanks; and a uniquely compact, comprehensive control board-instrumentation combination. Particular attention is directed to the utilization of slackless couplers throughout the train in order to avoid startup, slowdown, and braking shocks.

BRIEF DESCRIPTION OF THE DRAWINGS

The above as well as other features of the present invention will become more apparent upon reference to the drawings wherein:

FIGS. 9A and 9B are views in the direction shown by 9A-9A in

FIG. 8 illustrating the locking arm and its actuation;

in FIG. 20;

DETAILED DESCRIPTION OF THE PREFERRED EMBODIMENTS

The detailed description set forth below in connection with the appended drawings is intended merely as a description of the presently preferred embodiment of the invention, and is not intended to represent the only form in which the present invention may be constructed or utilized. The description sets forth the functions and sequence of steps for construction and implementation of the invention in connection with the illustrated embodiment. To be understood is that, however, the same or equivalent functions and sequences may be accomplished by different embodiments that are also intended to be encompassed within the spirit and scope of the invention.

Figure 1:
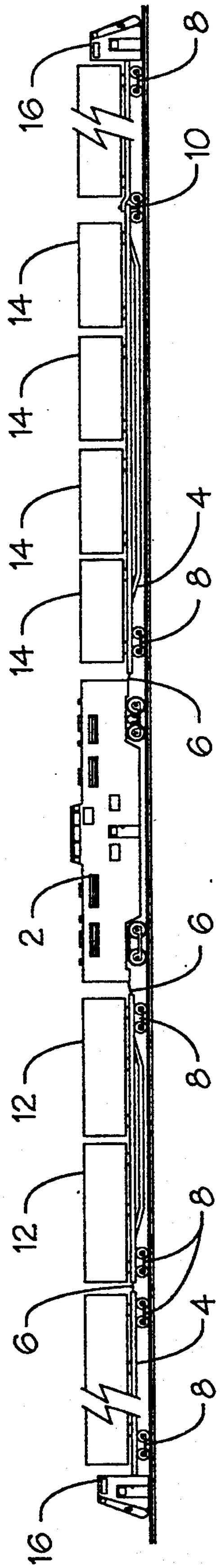
FIG. 1 shows a side view of the container train of the present invention.
Figure 20:
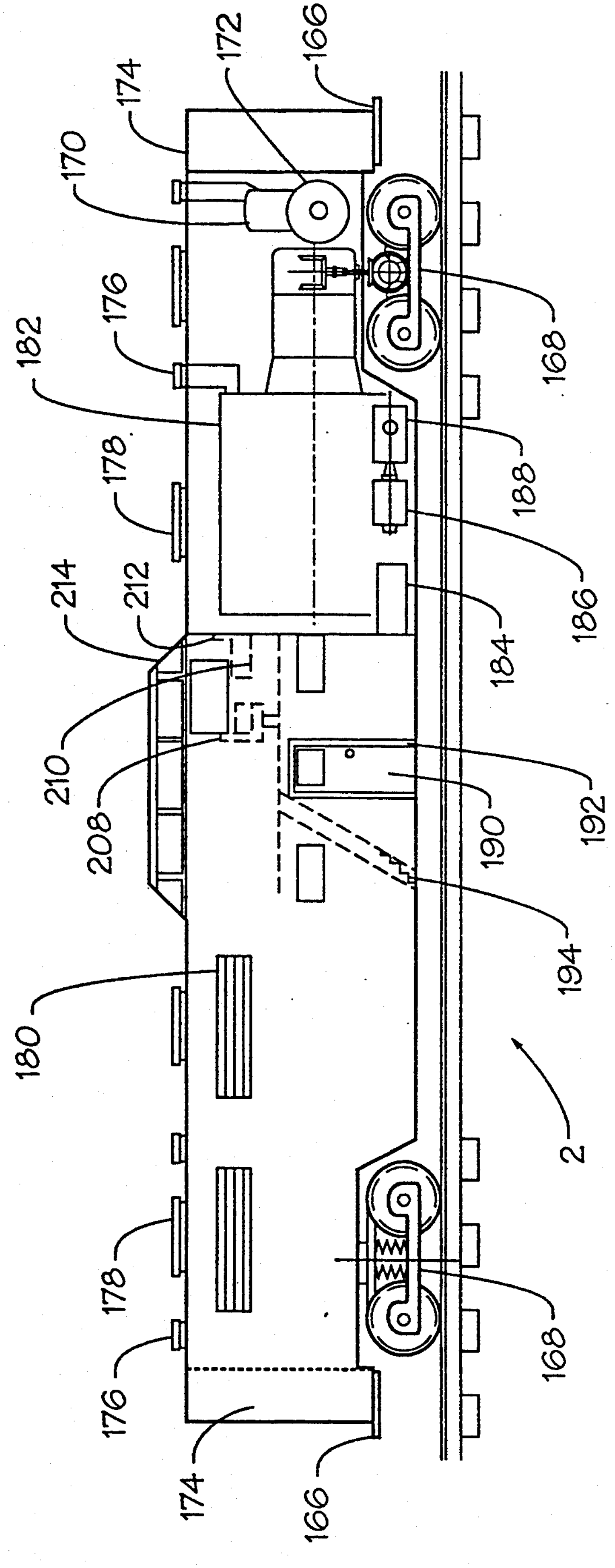
FIG. 20 is a side view and partial section of the power control unit.
Figure 21:
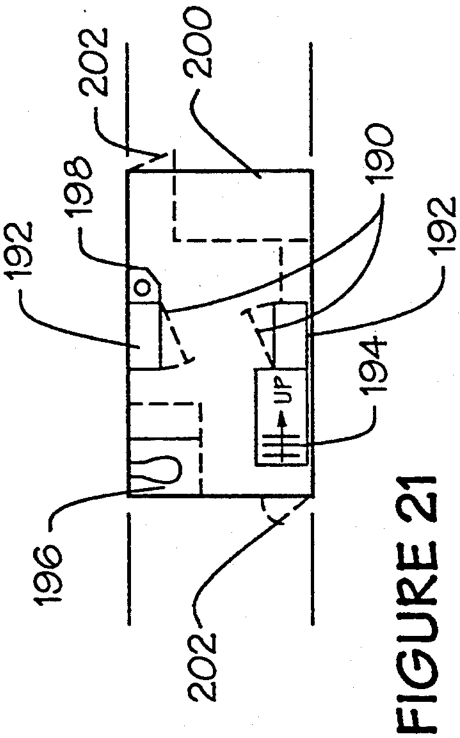
FIG. 21 is a plan view of the crew's quarters located on the lower deck of the power control unit shown in FIG. 20.
Figure 22:
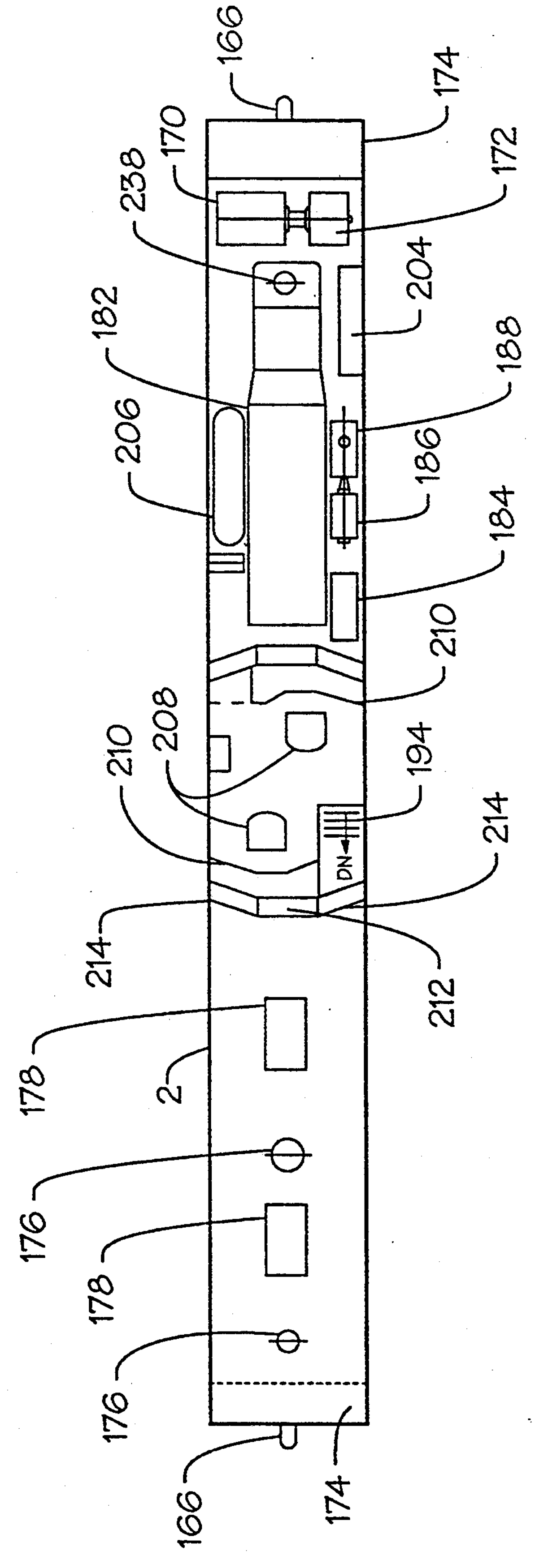
FIG. 22 is a top, partial section and plan view of the upper deck control cabin of the power control unit shown in FIG. 20.

Referring particularly to FIG. 1, shown is the self-loading-unloading cargo train of the present invention. Various components are shown with varying sizes of cargo units. The power control unit 2, described in more detail hereinafter and as shown in more detail in FIGS. 20–22, is located in the center of the container train system Platform cars 4 are disposed on each side of the power control unit 2 and are attached to the power control unit 2 and other platform cars 4 by slackless couplers 6. The platform cars 4 are supported by four-wheel trucks 8 at both ends. Also recognized is that, as an alternative, the platform cars 4 may also be supported by a four-wheel truck 10 which is centered between and shared by two platform cars 4 and the truck 10 supports both platform cars 4 at that single point, commonly described as articulation. Shown are two 40-foot containers 12 secured on a platform car 4 to be transported and four 20-foot containers 14 secured on top of a platform car 4. At each end of the self-loading and unloading container train is an end cab 16 secured to and supported by an end platform car 4.

Figure 2:
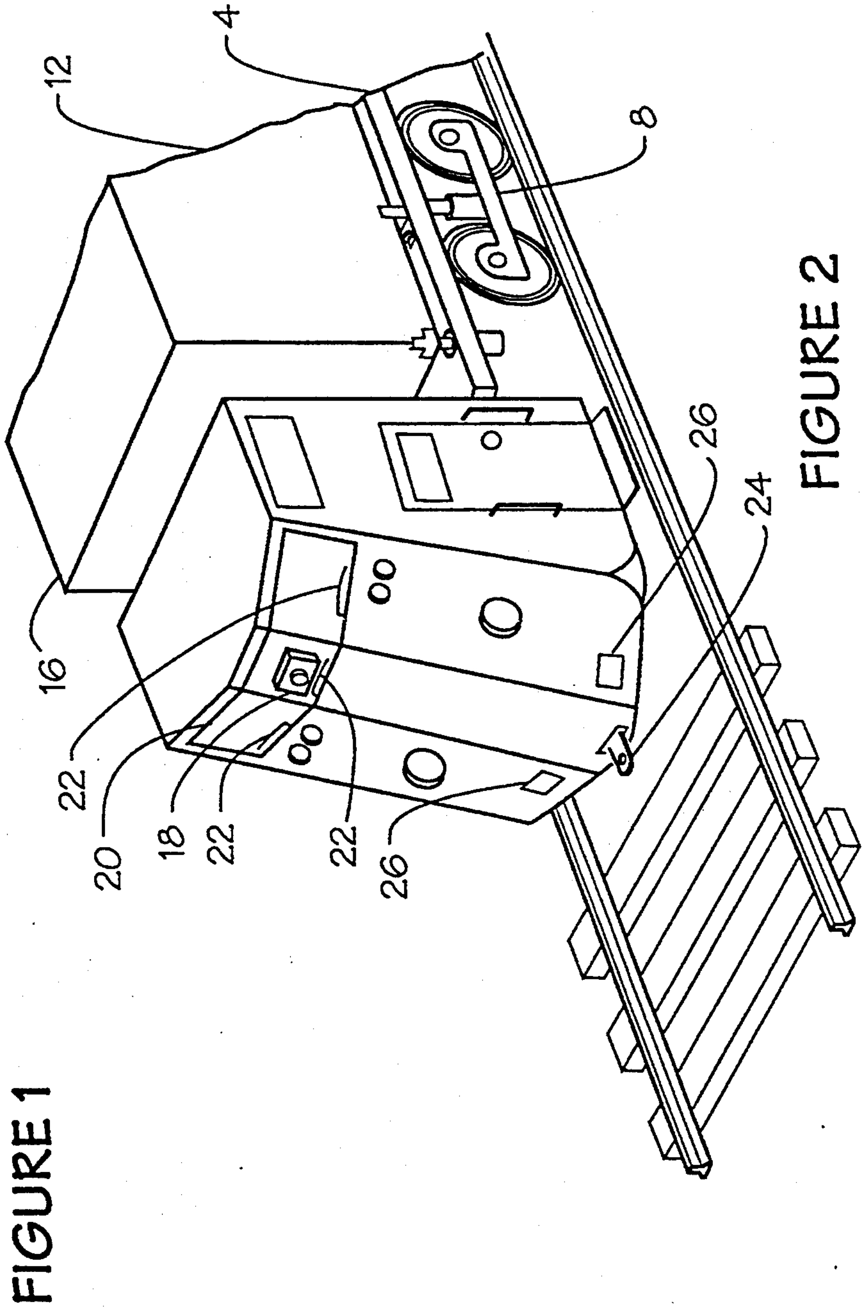
FIG. 2 is an enlargement of an end cab of the container train of FIG. 1.

Referring more particularly to FIG. 2, an enlarged perspective view of the end cab 16 is shown. The end cab 16 houses closed-circuit TV cameras 18, including but not shown radar and other equipment required for automatic operation of the container train. The closed circuit cameras 18 are in communication with monitors located within the power control unit 2 to provide visibility so that the container train may be operated either manually or automatically from the central power control unit 2. Transparent windshields 20 are shown equipped with defrosting mechanisms (not shown) wipers 22 and washers (not shown) which may be actuated automatically remotely or manually by the train crew so that both forward and rearward visibilities are maintained. As can be appreciated, the train may operate in either direction and accordingly, end cabs 16 are located on each end of the container train. In normal operation, the train is automatically or manually operated from the power control unit 2 and the end cabs 16 are not manned, but where circumstances require, the train may also be manually operated from either end cab 16.

From time to time, the necessity may arise for two or more complete container trains to be coupled together, and this may be accomplished via end cabs 16 connected by means of slackless couplers 24. The trains may be interfaced electrically through electrical connectors (not shown) behind access doors 26. The electrical connection between container trains makes it therefore possible that two interconnected container trains may be operated by a single crew or by a single power control unit 2.

Figure 3:
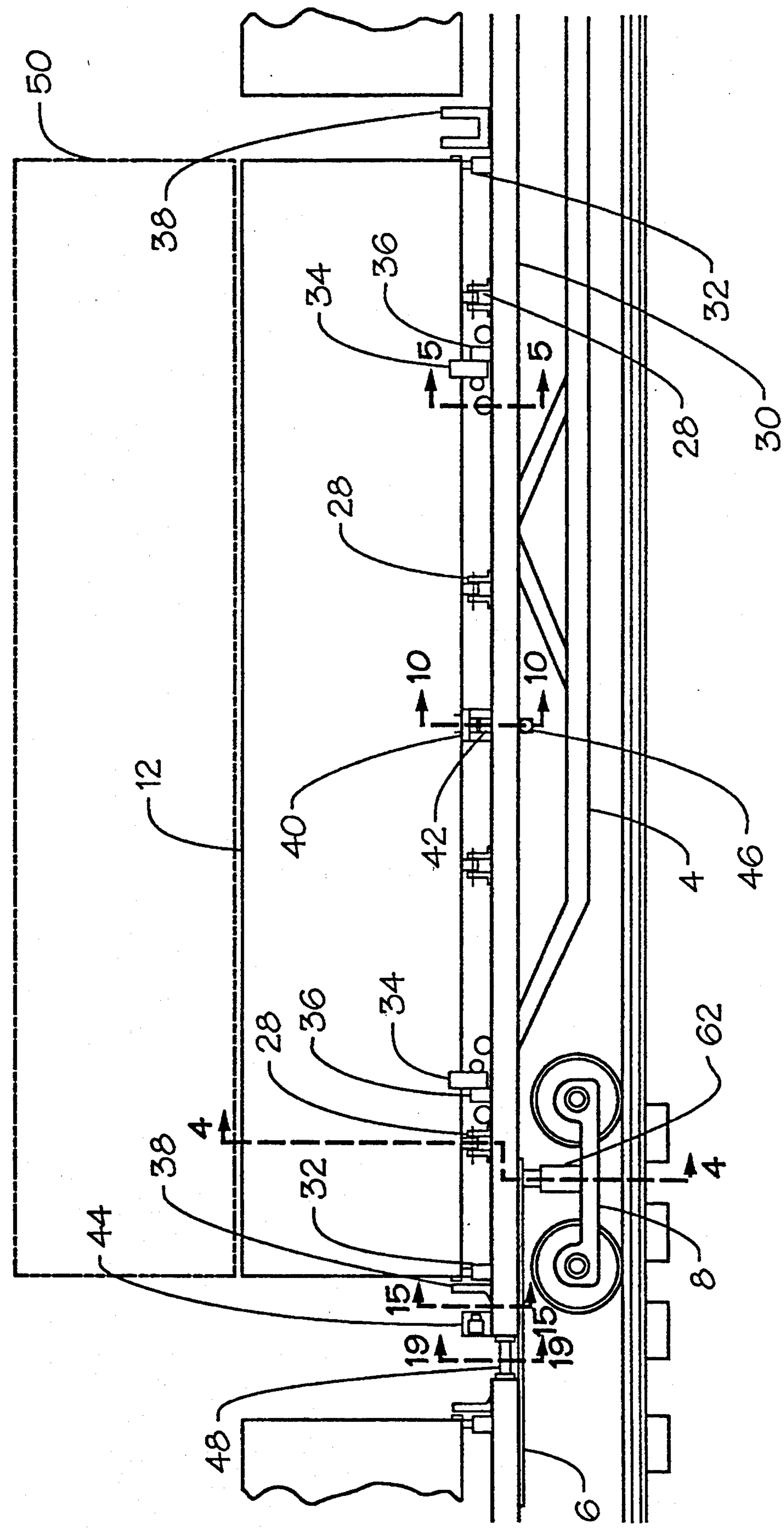
FIG. 3 is a representative side view of the platform car of the present invention with transverse sections indicated.

Referring particularly to FIG. 3, a partial side view, enlarged, of a platform car 4 is shown and includes various transverse indicators namely transverse sections 4—4, 5—5, 10—10, 15—15 and 19—19. The cargo container 12 is supported by casters 28 fixed to the platform car bed 30 positioned and fashioned to allow the cargo container 12 to be moved freely laterally or sideways. To restrain the container 12 securely to prevent movement relative to bed 30 during transport, vertically movable anchors 32 are positioned at each bottom corner of the transport container 12. Clamps 34 fixed to the loading-unloading articulated arm 36 in addition to providing an unloading and loading function as described more fully hereinafter also aid in securing the cargo container 12 during transport. End guides 38 secured to the bed 30 of the platform car 4 are also provided to position the cargo container 12 axially.

Figure 14:
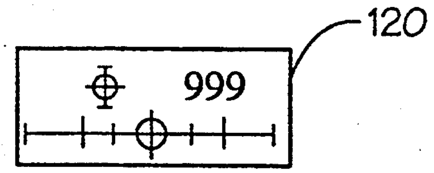
FIG. 14 is a detail of the placard affixed to the platform or to the frame rails of train cars and trucks.

On the underside of cargo container 12 located in the center and on each side are shipping instruction placards 40. The printing or bar code is read by closed circuit cameras 42 located on each side of the center of a container located on the platform car 4. Two cameras, one on each side of the platform car 4 are provided as a redundant system to insure positive readout is transmitted to the power control unit 2 of the transport container train. At the end of each platform car 4, and directed along the sides of the platform car 4 are surveillance cameras 44 which are provided to allow viewing of loading and unloading of the cargo containers 12 from either the power control unit 2 or the end cab 16. An additional camera 46 is aimed out laterally from the platform car 4 to provide viewing and readout of placards 120 (FIG. 14) affixed for identification on a mating train, truck or platform and to enable proper line-up and coordination for container transfer. To be recognized is that each of the cameras may be fitted with properly sized and aimed lamps or lighting fixtures for night operation. As can be appreciated, the cameras identified as 42, 44, and 46 may be replaced with a bar code reader or other similar scanning device which would provide the same function of identification of cargo containers, verification and monitoring of loading of cargo containers and proper coordination of mating train, truck or adjacent platform. A cable 48 is additionally provided to interconnect electrically or optically each platform car 4 for transmitting data, power and/or video signals to the power control unit 2 or end cabs 16. As can be appreciated, the use of multiplexing and power buses may be utilized to reduce the complexity of the transferred data.

The container train of the present invention may accommodate stacked containers as illustrated in FIG. 3 by the top cargo container 50 shown in phantom. In order to effectuate the stacking of cargo containers, lifting would be necessary which is contrary to the concept of the present invention which aims to eliminate lifting equipment. For more load-carrying capacity, a taller container is preferable to stacking. The envisioned high frequency of operation is expected to make stacking obsolete.

Figure 4:
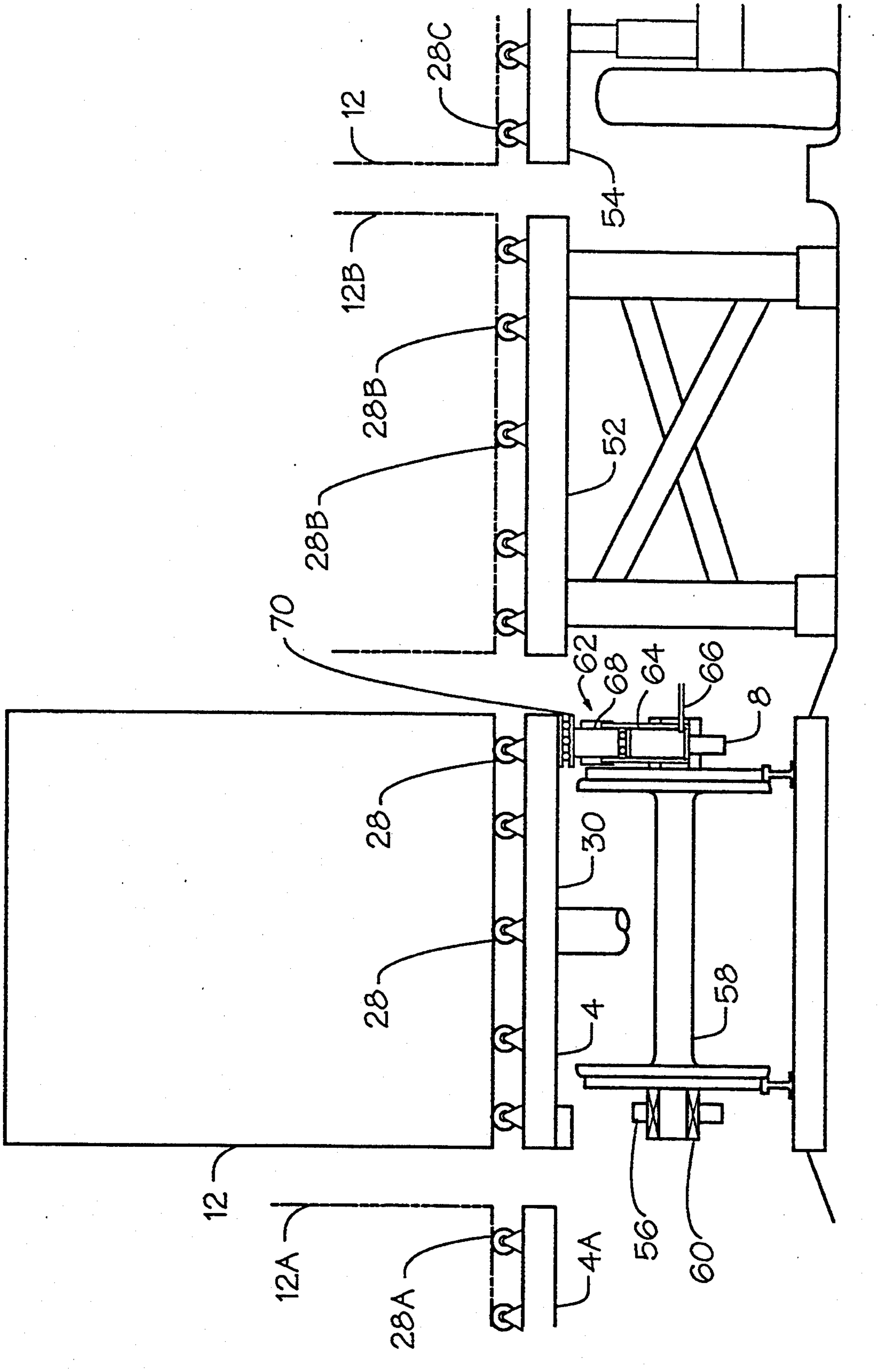
FIG. 4 is representative of transverse section 4—4 of the platform car shown in FIG. 3 and additionally includes an associated support platform, loading vehicle, and an adjacent platform car.

Referring particularly to FIG. 4, shown is transverse section 4—4 as identified in FIG. 3 and additionally included are a platform support 52, a truck carried support 54 and an adjacent platform car 4A. The cargo container 12 rests on the bed 30 of the platform car 4 via a plurality of weatherproofed roller bearinged casters 28 which do not swivel, and are fixed to the platform 30 of the platform car 4, the bed of adjacent platform car 4A, platform support 52 and truck support 54. The casters 28 provide low friction rolling for lateral transfer of containers such as cargo container 12. The frame 56 of the four wheel trucks 8 is mounted on the wheel and axle assembly 58 via roller bearings 60 to assure low rolling friction, particularly at startup when positioning the train horizontally for loading and unloading.

For vertical positioning of the bed 30 of the platform car 4, for example, to match the level of a platform support 52, an air spring 62 is mounted on two sides each four-wheel truck of the platform car 4. Chamber 64 is subject to variable fluid pressure introduced through passage 66 and which changes the vertical position of piston 68. Force is directed therefore upwardly to the bed 30 of the platform car 4 via a ball thrust bearing 70. The air springs 62 are supplemental to the usual coil or leaf spring suspension which is not illustrated. In addition to their primary leveling function, the air spring assemblies 62 act as shock absorbers, sway restricters and stabilizers on curves.

Figure 5:
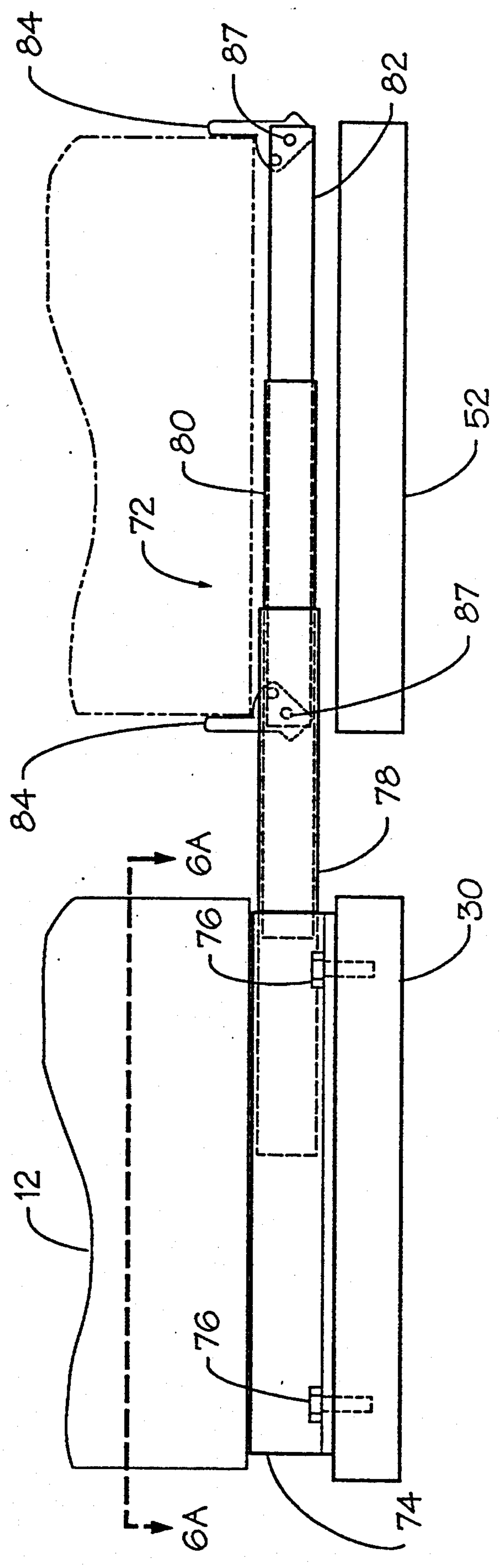
FIG. 5 illustrates transverse Section 5—5 of the platform car shown in FIG. 3 showing the collapsible articulated arm loading-unloading device and clamping mechanism.

Referring more specifically to FIG. 5, illustrated is the collapsible or extensible arm assembly of the present invention of the platform car 4 and is representative of transverse Section 5—5 as shown in FIG. 3. Each platform car 4 is fitted with two, or more, collapsible arm assemblies 72. Each collapsible arm 72 is comprised of a fixed member 74 secured by bolts 76 and includes horizontal members 78, 80 and 82. The articulated collapsible or extensible arm assembly is likened to the opening and support mechanism of a file drawer. Also, it can be similar to telescoping arms used industrially. Clamps, or grippers, 84 are pivotally connected to the ends of member 82 of the articulated arm 72 via fulcrum pins 87.

Figure 6B:
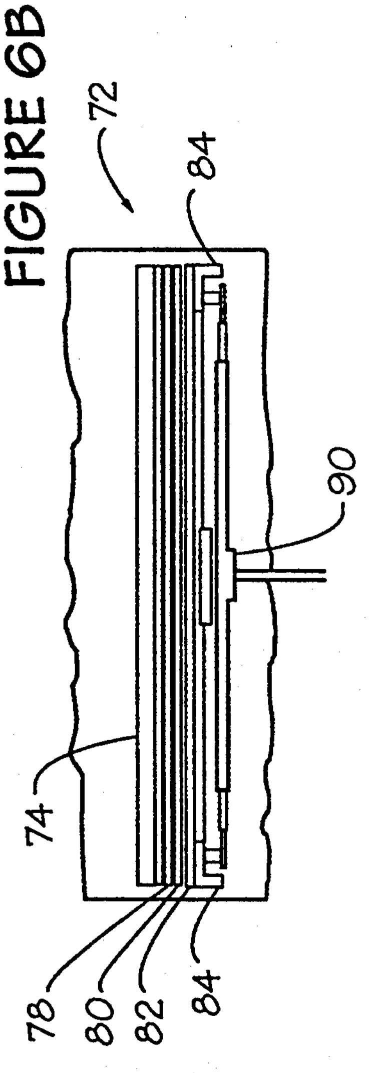
FIG. 6B is a view of transverse Section 6A—6A of the collapsible articulated arm in a collapsed position.
Figure 6A:
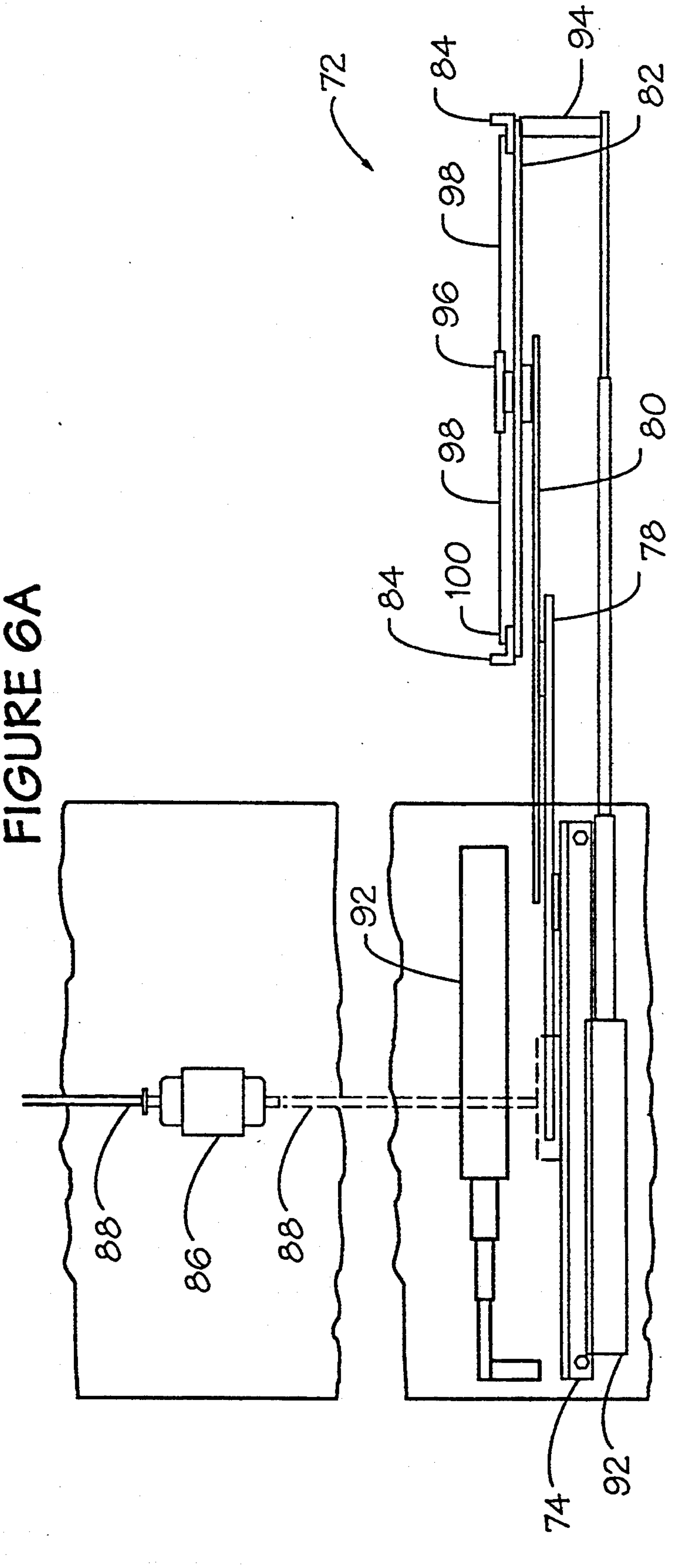
FIG. 6A is a view of transverse Section 6A—6A of the collapsible articulated arm as shown in FIG. 5 in an extended position.

Refer more particularly to FIGS. 6*a* and 6*b* which represent transverse view 6A—6A as shown in FIG. 5 wherein FIG. 6*a* represents the articulated collapsible arm 72 extended and FIG. 6*b* shows the articulated collapsible arm 72 in a collapsed position. A motor 86 interconnects to the collapsible arm 72 via a drive shaft 88. Actuating the motor 86 propels the drive shaft 88 which connects to an internal double-acting mechanism 90 for moving the articulated collapsible arm 72 in either direction, i.e. to either side.

FIG. 6*a* shows an alternate method of extending the collapsible or extensible arm 72 via a fluid-operated cylinder and piston assembly 92 which drives the arm 72 through a connector 94. The motion of the piston and cylinder assembly 92 is similar to a retractable mast antenna, and two such pistons 92 are provided, to operate the collapsible arm 72 in either direction. Yet another method of extending the collapsible articulated arm 72 is by the motor 86 connected to shaft 88 which drives a rack and pinion thus moving the articulated collapsible arm 72 in either direction.

Figure 7:
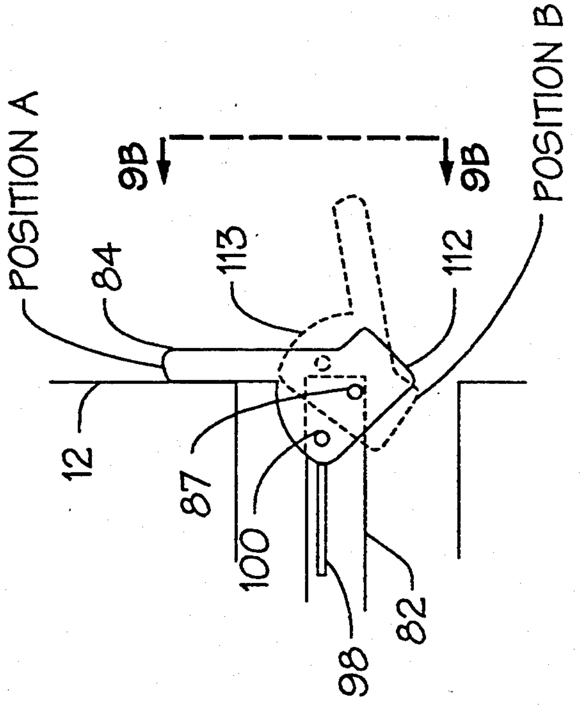
FIG. 7 is an enlarged view of the clamping mechanism shown in FIG. 5.

Referring particularly to FIG. 7, shown is an enlarged view of the clamping mechanism 84 as illustrated in FIG. 5. Rotatable clamp 84 is attached to member 82 of the articulated collapsible arm 72 via a fulcrum pin 87. Also attached to member 82 is a fluid actuated cylinder and double piston assembly 96 (shown in FIG. 6*a*). The pistons of the piston assembly 96 actuate rods 98 which attach to clamps 84 in a rotatable manner or joint at 100. When the pistons retract toward the center of cylinder 96, the clamps 84 are raised and grasp the container 12 as shown in position A of FIG. 7. When the rods 98 move outwardly, clamps 84 retract to position B as shown in FIG. 7 allowing the articulated collapsible arm assembly 72 to be free from the container 12.

As an alternative to the above-collapsible arm assembly 72 and clamps 84, the rollers and casters 28 as shown in FIGS. 3 and 4 may be motorized. However, positive control or positioning of the containers is a necessity and motorization would be required on the mating train, truck, or rack to complete the loading and unloading operation. Accordingly, the method as described by the collapsible articulated arm 72 is the preferred embodiment of the present invention.

Figure 8:
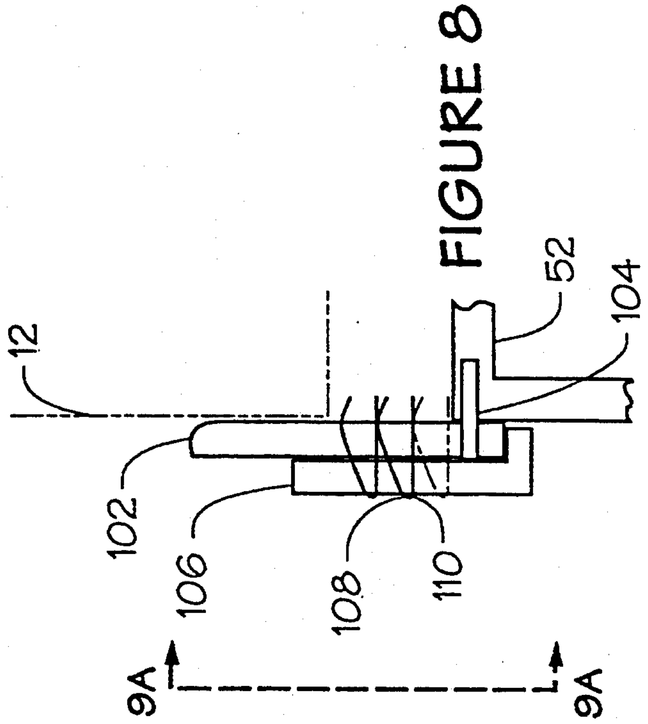
FIG. 8 is the detailed enlarged view of automatic actuated locking arm which is mounted to the adjacent support platform as shown in FIG. 4.
Figure 9B:
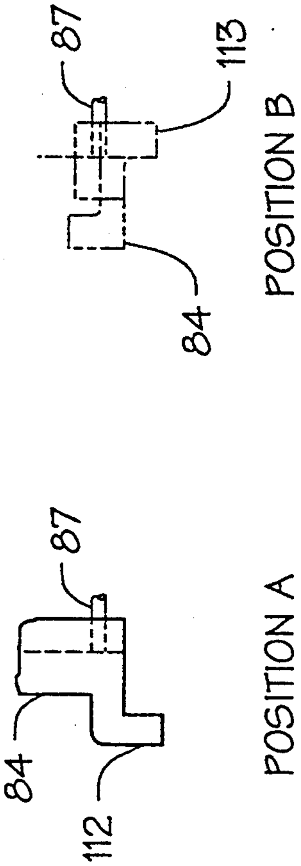
Figure 9A:
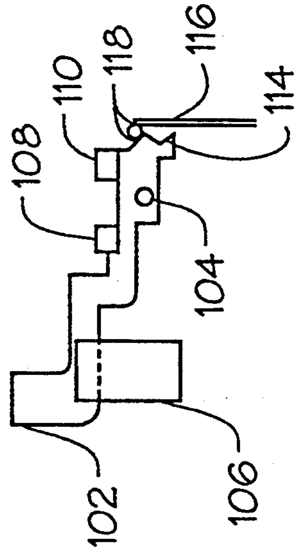

Referring to FIG. 8, shown is an automatically actuated locking arm 102 which is rotatably mounted to the adjacent platform support 52 via pin 104 and restrained by guide 106. Refer additionally to FIGS. 9A and 9B which show view 9A—9A of FIG. 8, pads 108 and 110 on arm 102, and protrusions 112 and 113 on clamp 84.

During off-loading of a container 12 from train car 4 to a fixed platform 52, clamp 84 is in position A as shown in FIG. 7. When lateral motion occurs, protrusion 112 on clamp 84 engages pad 108 on locking arm 102 forcing it downward to the unlocked condition. This motion raises notch 114 on arm 102 upward so that it is engaged by spring roller assembly 116 thus holding arm 102 in the unlocked mode. Completing the off-loading of container 12 from car 4 to a fixed platform 52, clamp 84 is rotated to position B in FIG. 7. This allows collapsible arm 72 to be retracted toward car 4, and protrusion 113 on clamp 84 engages pad 110 on locking arm 102 forcing it upward into the locking position. Notch 118 is then engaged by spring roller assembly 116 thus holding arm 102 in a locked mode. For on-loading, the sequence is reversed. On the opposite side of adjacent platform support 52 is another identical mechanism such that container 12 would be restrained from moving in that direction after the articulated collapsible arm 72 is retracted.

Figure 10:
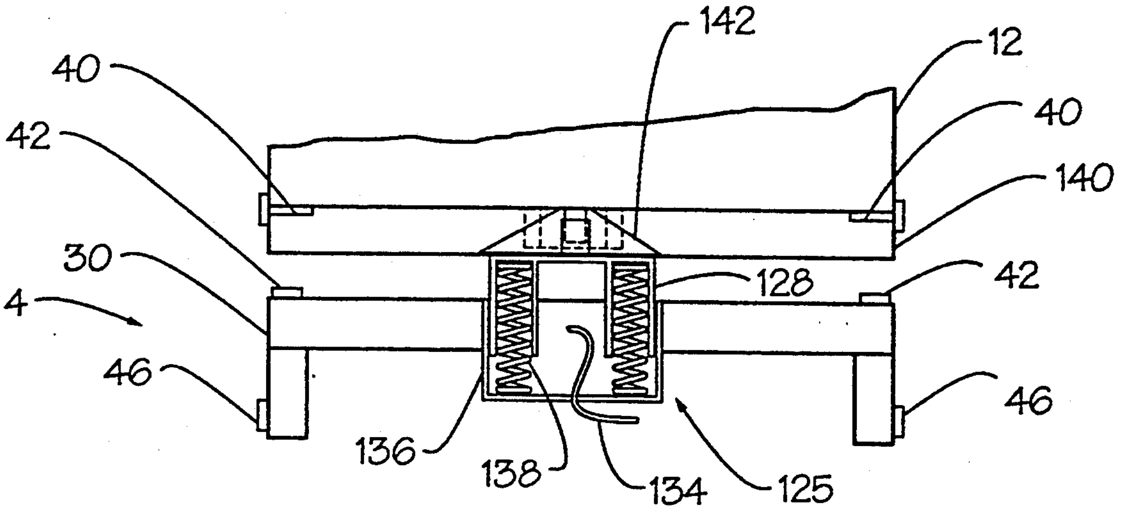
FIG. 10 is a view of transverse Section 10—10 of FIG. 3 showing the electrical connection provision for the cargo containers.

Referring particularly to FIG. 10, illustrated is transverse section 10—10 appearing in FIG. 3 and which comprises provisions for horizontal and vertical alignment plus also provision for supplying electrical power to the transport container 12. Further shown are shipping instruction placards 40 on the underside of the cargo container 12 located on each side of the center of the container 12. The printing or bar code is read by closed circuit cameras 42 located on the container centers on each side of the bed 30 of the platform car 4. Two cameras per container, one on each side of the platform car 4 are provided as redundant systems to insure positive readout is transmitted to the power control unit 2 of the transport container train. Additional cameras 46 are aimed laterally out from the platform car 4 to provide viewing and readout of placards 120 affixed for identification on a mating train, truck or platform to enable proper lineup and coordination for container transfer; refer to FIG. 14. For example, cameras 46 provide horizontal and vertical readout plus the station number for lineup information by virtue of placards 120 mounted on adjacent container supports, such as trucks, trains, or platform 52. Use of cameras 46 is similar to that of a viewfinder in a conventional camera, and the platform car 4 must line up horizontally and vertically within the limits indicated in the detail and at the desired numbered location. The preferred method of operation is automatic, but as can be appreciated, the lineup may be done manually through terminals onboard the power control unit 2.

Figure 12:
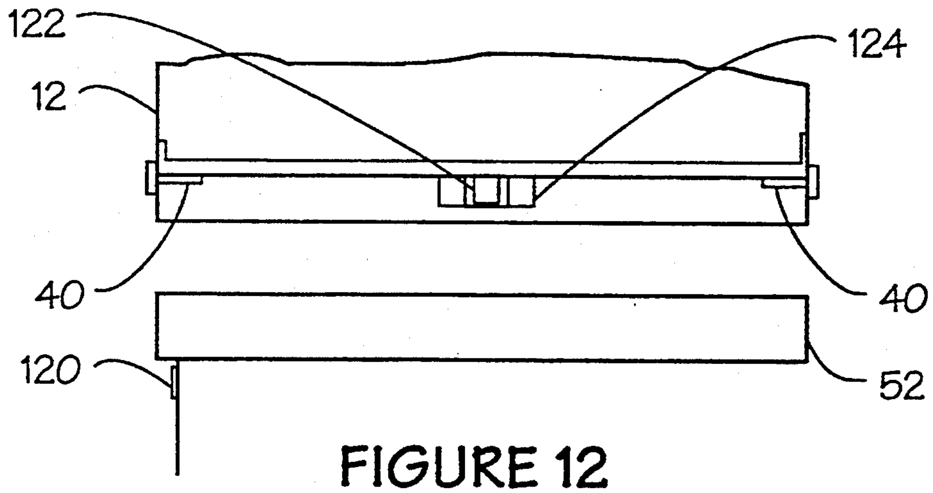
FIG. 12 is a view of the cargo container above the adjacent side support platform.
Figure 13:
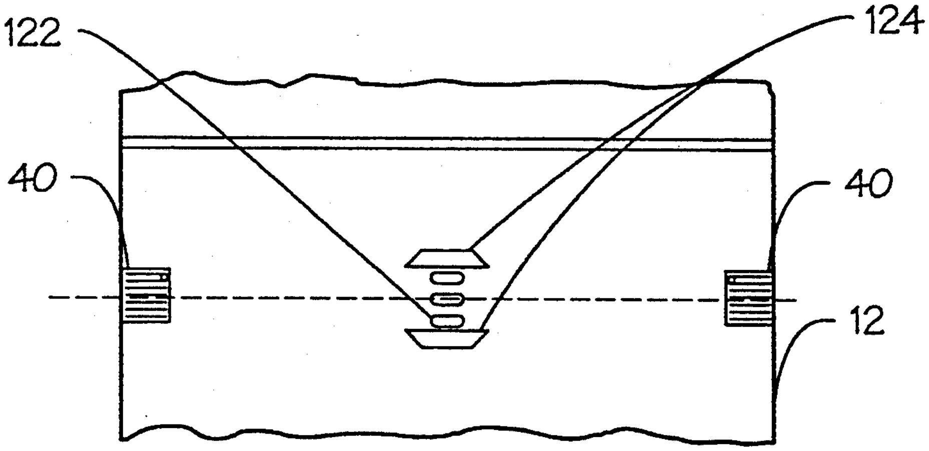
FIG. 13 is a partial bottom view of the cargo container and adaptive electrical connector housing of the cargo container.

FIG. 12 shows the cargo container 12 above an adjacent support platform 52. Where necessary, cargo containers requiring electric power for refrigeration or the like, include knife-type connectors 122 located within a partial housing 124. FIG. 13 is representative of a bottom view of the container 12 as shown in FIG. 12.

Figure 11:
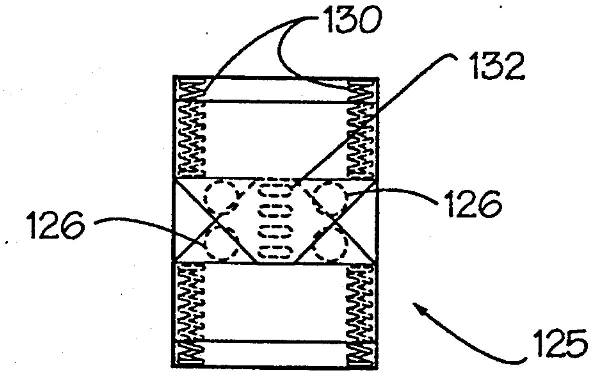
FIG. 11 is a top view of the electrical connector provision as shown in FIG. 10.

Referring again to FIG. 10, the container 12 is shown being engaged with the power provision unit 125 as also shown from a top view in FIG. 11. The power provision unit 125 comprises weatherproof covers 126 which are mounted to housing 128 on the platform car 4. The covers 126 are adapted to receive the tapered ends of the partial housing 124 of the container 12. The tapered ends of the partial housing 124 open the covers 126 by extending them in a longitudinal direction against the springs 130. This allows knife blades connectors 122 to engage similar knife-type connectors 132 which are fixed to the housing 128 and which connect to a power source 134, thus providing electrical power to the container 12. To assure that the knife-type connectors 132 properly engage blades 122, housing 128 slides vertically in fixed mounting 136 under the influence of springs 138. The vertical distance is limited upwardly such that the stringer 140 of container 1.2 can engage the ramp 142 of the covers 126 and limit downward movement so that a stringer 140 can pass over covers 126. As can be appreciated, an optional method of operation provides the fixed mounting 136 with limited longitudinal motion to allow for misalignment of the partial housings 124 with the covers 126.

Figure 15:
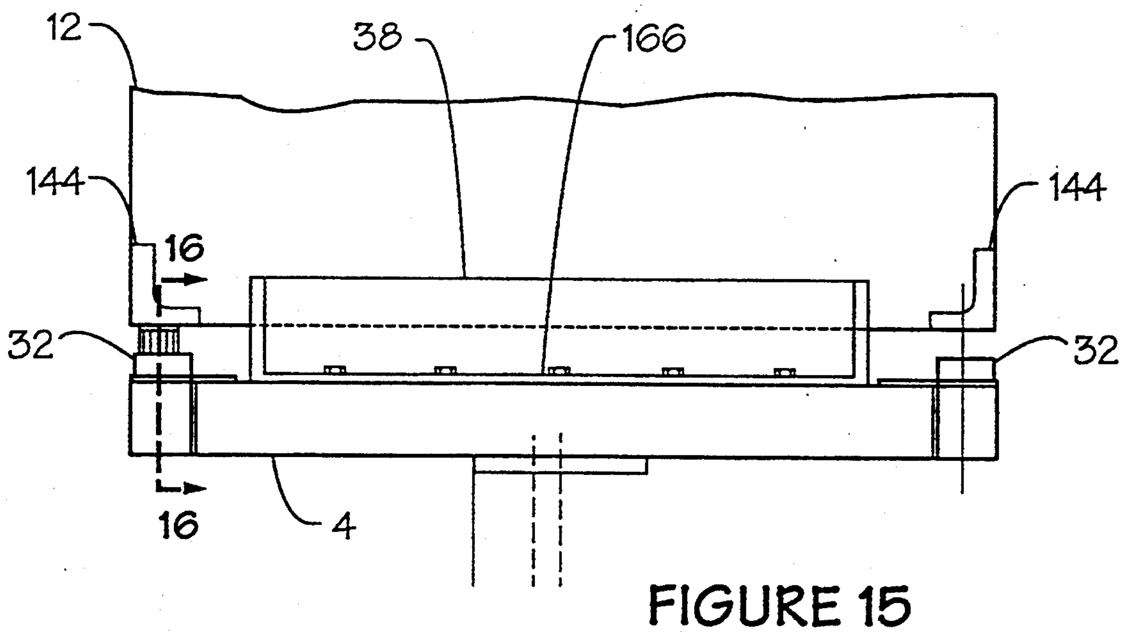
FIG. 15 is representative of the view of transverse Section 15—15 of FIG. 3 illustrating the locking of the container to the platform car and end guide to limit fore and aft movement of the cargo container.

FIG. 15 is representative of transverse view 15—15 as shown in FIG. 3 and illustrates container anchors 32 and end guides 38 of a platform car 4. Commonly utilized containers 12 are fitted with corner braces 144 that permit lifting and anchoring or locking. The platform car 4, or any container moving vehicle, is fitted with anchor assembly 32 as shown in FIG. 16.

Figure 16:
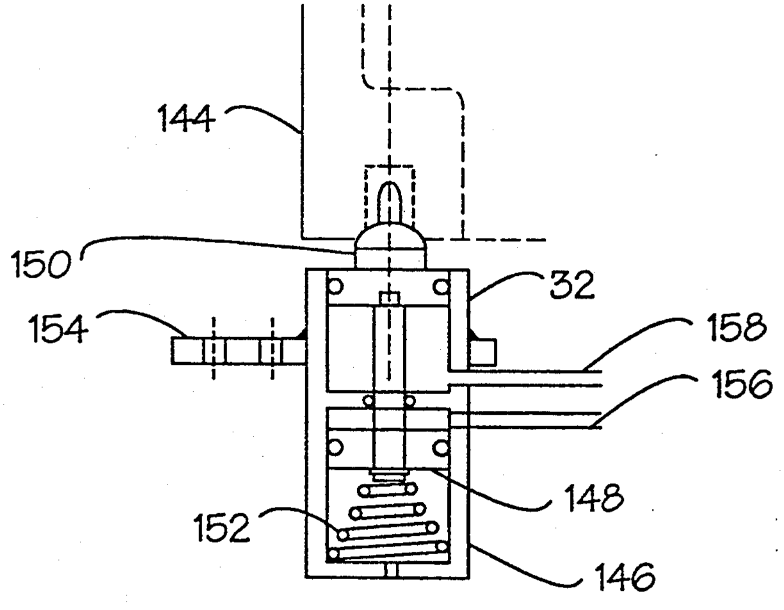
FIG. 16 is a view of transverse Section 16—16 of FIG. 15 showing an anchor assembly.
Figure 17:
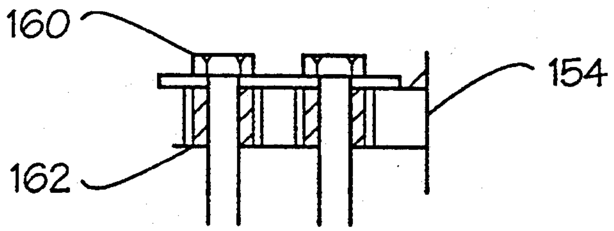
FIG. 17 is an enlarged view of the mounting of the anchor assembly shown in FIG. 16.

FIG. 16 is representative of transverse view 16—16 as shown in FIG. 15 and the anchor assembly 32 comprises a housing 146, piston assembly 148, anchor 150 and spring 152 in mounting 154. Fluid pressure in a line 156 acts against the spring 152 and retracts anchor 150 from the corner brace 144 thus freeing container 12. The purpose of spring 152 is to assure anchoring or locking in the event of fluid pressure failure in line 158. FIG. 17 shows an enlarged view of the mounting 154 and includes hold down bolts 160 via sleeves 162 allowing slight horizontal motion of the assembly 32 for proper alignment of anchor 150 into the corner brace 144. If vertical hold down is necessary, the provision for rotating anchor 150 may be implemented.

Figure 18:
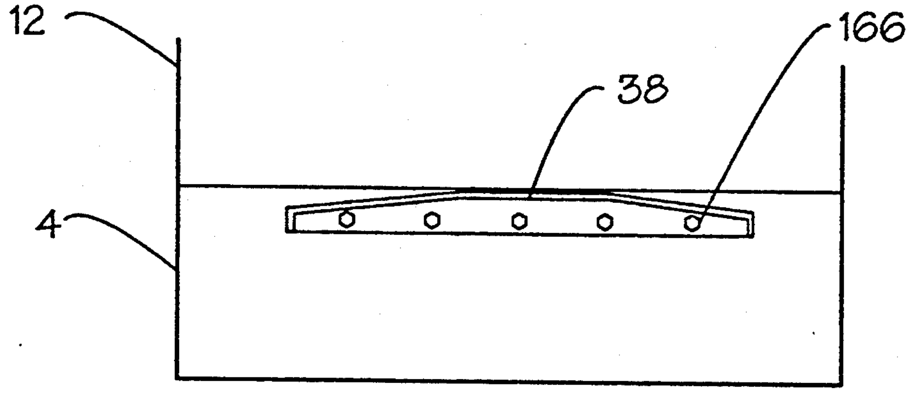
FIG. 18 illustrates the end guide of the platform car.

Referring specifically to FIG. 18, in order to assure proper longitudinal positioning of container 12, as it is transferred onto the platform car 4, end guide 38 is provided. The end guide 38, as shown in FIG. 3, is fastened to the bed 30 of the platform car 4 by bolts 166. Guides, such as the end guide 38, must be provided at each end of each container position on the platform car 4 or on the adjacent platform supports 52, trucks or other vehicles.

Figure 19:
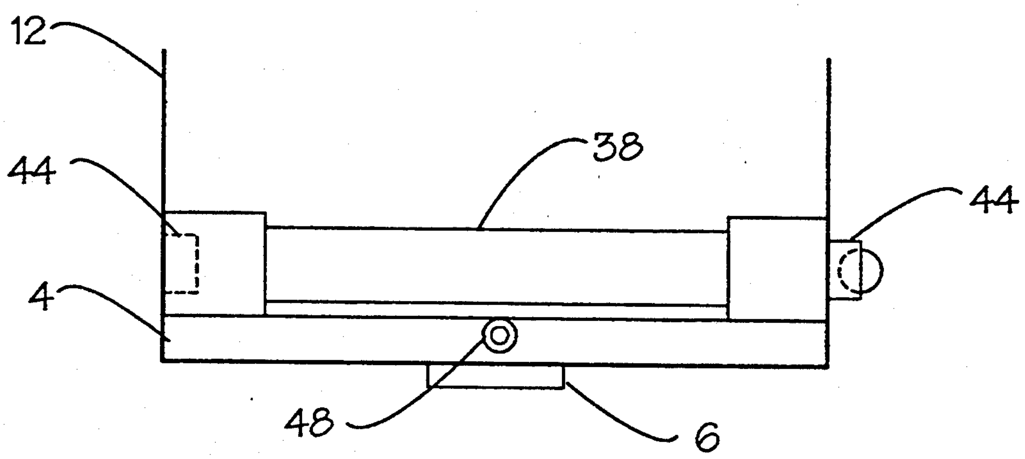
FIG. 19 is representative of the view of transverse Section 19—19 of FIG. 3 including surveillance camera, slackless coupler, and end guide.

FIG. 19 is representative of the transverse view 19—19 as shown in FIG. 3. FIG. 19 illustrates the closed circuit TV surveillance cameras 44 located at the end of each platform car 4. At right the camera 44 may be extended for use and retracted as shown on the left when not needed. For night operation, an integral lamp may be required. Also shown in FIG. 19 is the end guide 38 and an end view of cable 48 and slackless coupler 6.

Referring to FIG. 20, illustrated is a side view and partial section of the power control unit 2. Of particular interest are drive train 182, auxiliary engine 170, generator 172, fuel tank 174, driving wheel system 168, motor 186, air compressor 188, water storage tank 184, and slackless coupler 166. Identical components are fitted to the opposite end of the power control unit 2 to provide not only double the tractive effort but also as a dual system for safety and backup. Other items of note are exhaust stacks 176, ventilators 178, radiator grilles 180, and the double deck crew's quarters accessed by doors 190 and stairway 194.

Referring to FIG. 21, shown is the crew's quarters on the lower level of the power control unit 2 and which consist of entry doors 190, vestibule 192, stairway 194, toilet 196, wash basin 198, bunk 200 and access doors 202 to the engine compartments.

Referring to FIG. 22, shown is a top view of the previously described features of the power control unit 2 as shown in FIGS. 20 and 21 including additionally battery bank 204, air tank 206, and on the upper level crew chair 208, control board 210 (shown in more detail in FIG. 24), instrumentation panel 212 (shown in more detail in FIG. 25) and windshields 214.

Figure 23A:
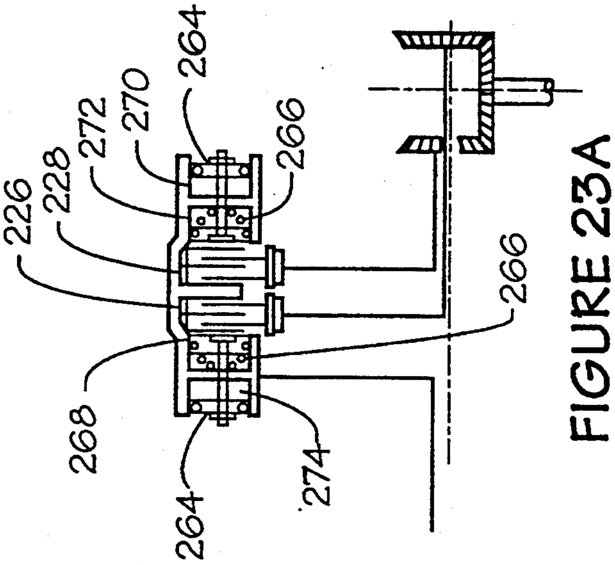
FIG. 23A is an optional braking device of the drive train as shown in FIG. 23.
Figure 23:
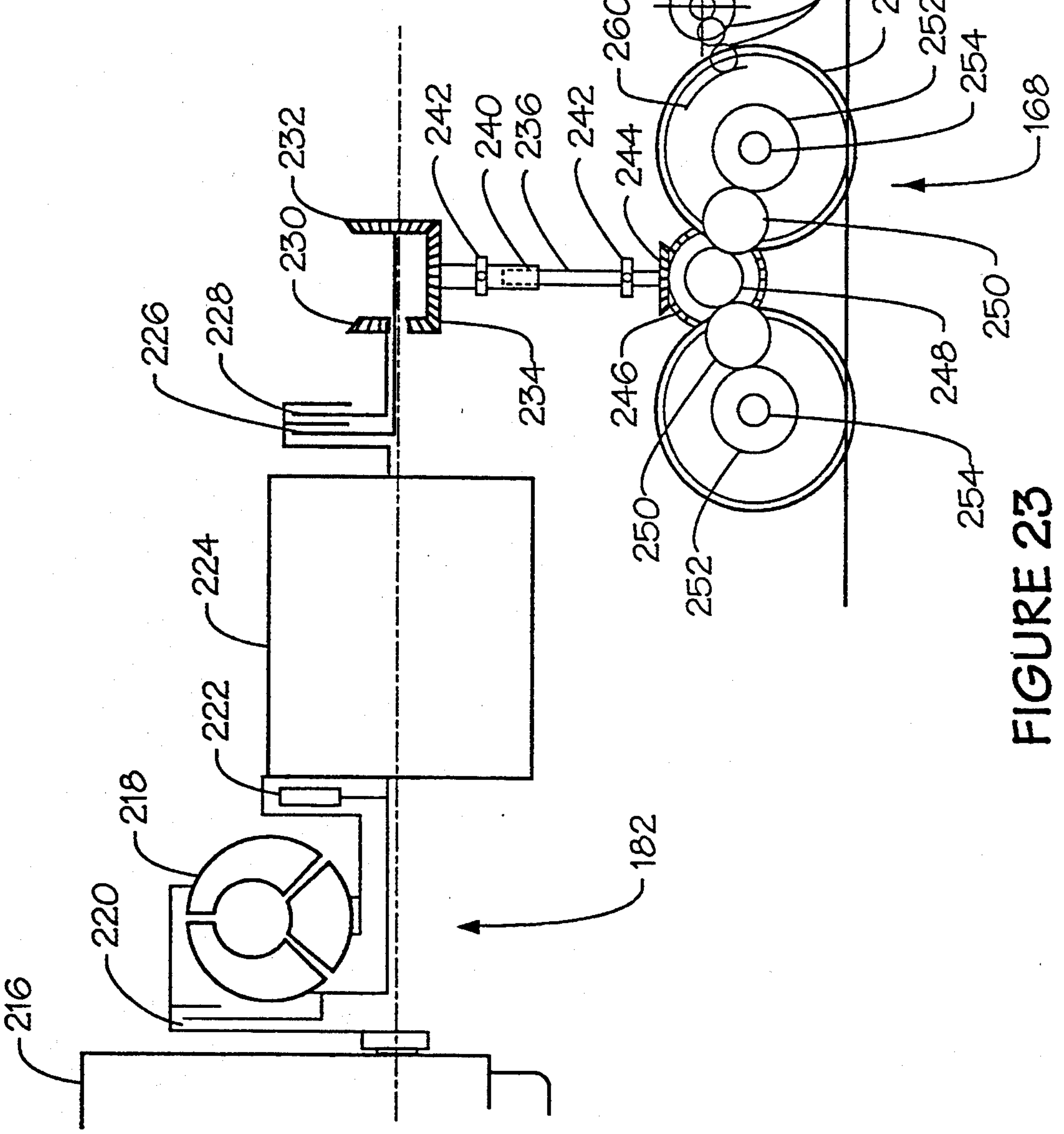
FIG. 23 is a cross-sectional, diagrammatic view of one of two of the drive trains, of the power control unit shown.

Referring to FIG. 23, illustrated is the drive train of power control unit 2 of the present invention. Shown are enlarged views of the power train 182 and the driving wheel system 168 as shown in FIG. 20. The main driving engine 216 is directly connected to hydraulic torque converter 218, lockup clutch 220, retarder 222 and multi-speed transmission 224, all shown diagrammatically. For full-time operation in either direction, the arrangement of clutches 226, 228 and bevel gears 230, 232 and 234 is provided, so that a reverse in transmission 224 is not required. To transmit power to truck assembly 168, vertical shaft 236 passes through swivel center 238 shown in FIG. 22. To allow for horizontal and vertical motion between the transmission 224 and the truck assembly 168 due to the suspension springing, shaft 236 is fitted with slip coupling 240 and the universal joints 242. Attached to the lower end of shaft 236 is bevel gear 244 driving mating bevel gear 246 which connects to gear 248. The gear 248 drives idler gears 250 which mesh with final drive gears 252 which are attached to driving wheel axle shafts 254.

A heavy-duty starting type reversing motor 256 is connected by gearing 258 to a large ring gear 260 which is attached to driving wheel 262. Gearing 258 is on a slidable shaft such that it can be engaged to gear 260 by a mechanical or electrical means similar to starter motors which engage ring gears on automobile fly wheels. With the train at rest, and all brakes released, engaging (one or more) motor 256 and related gearing, the train can be moved short distances in a controlled manner to line up platform cars with trucks, other trains or racks.

FIG. 23A is an alternate arrangement of clutches 226 and 228. In place of the usual construction of simple apply pistons with spring releases, double acting piston assemblies 264 are shown with springs 266 situated to apply the clutches in the absence of oil pressure. The hydraulic circuits are arranged so that if clutch 226 is required, chambers 268 and 270 are pressurized, applying clutch 226 and releasing clutch 228. For clutch 228, the opposite occurs by pressurizing chambers 272 and 274. The purpose is to provide an output shaft lock or brake when pressurized oil is absent.

Figure 25:
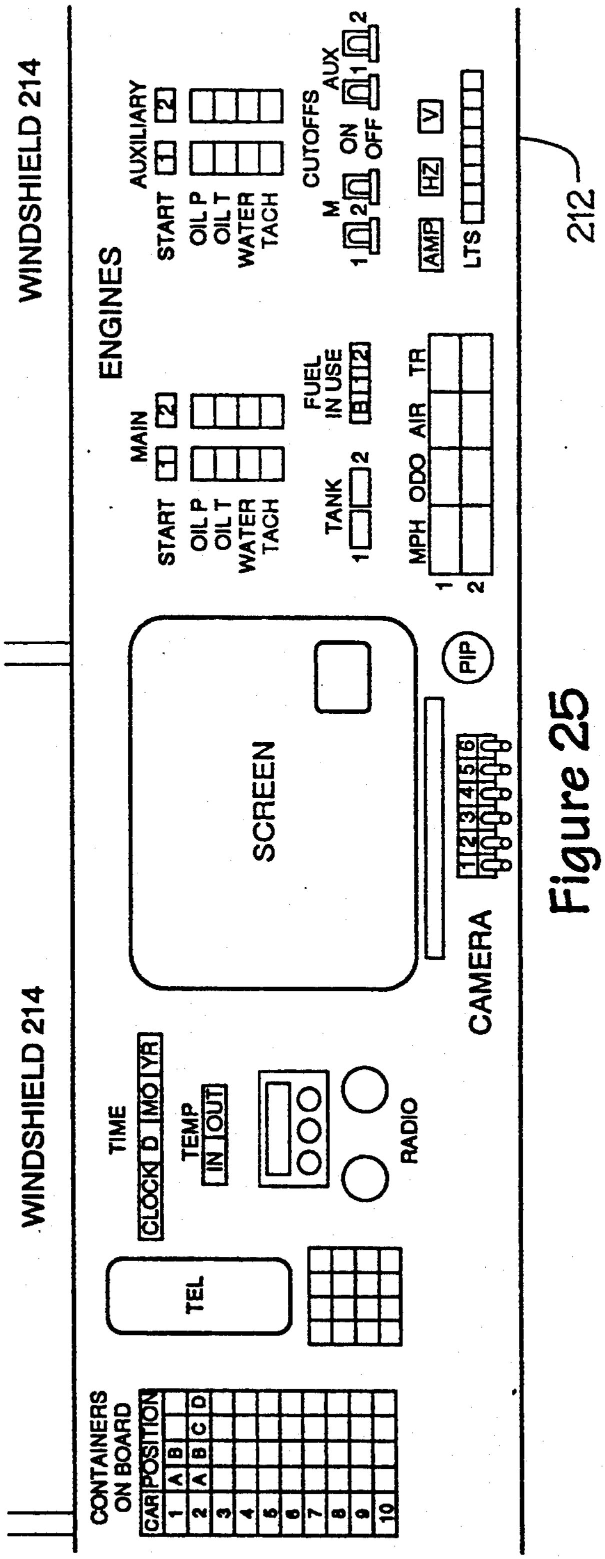
FIG. 25 is an end view of an instrument panel installed in the control cabin of the power control unit of FIG. 20.
Figure 24:
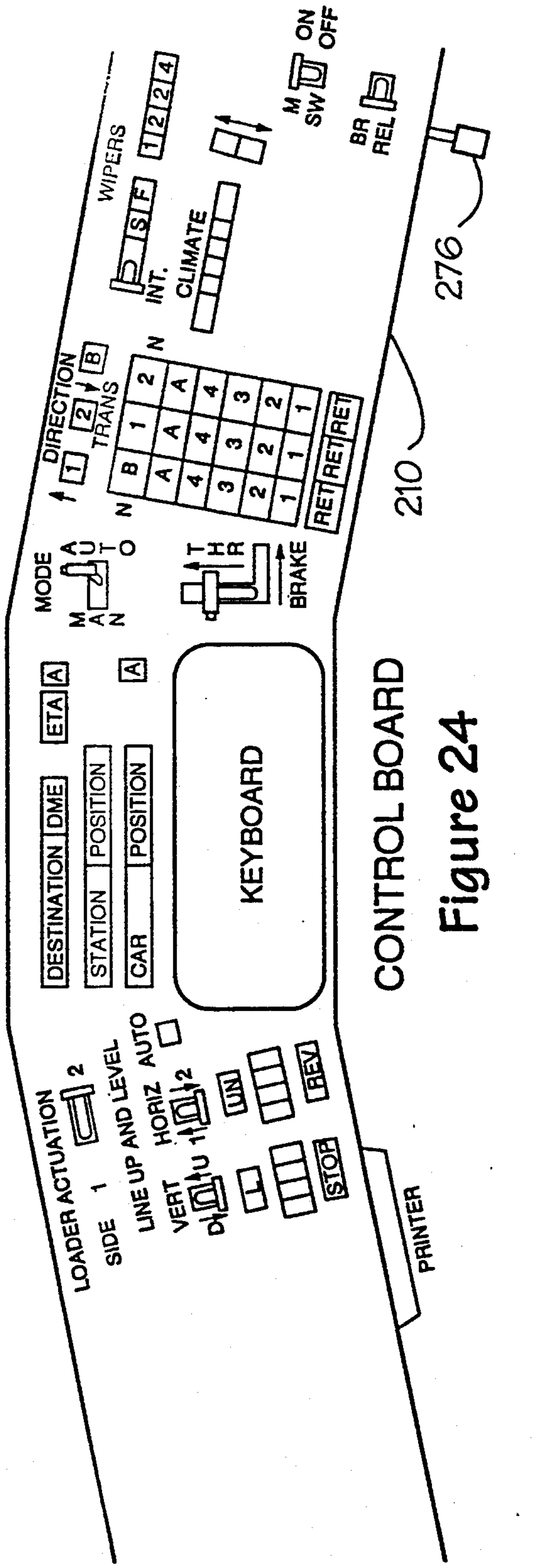
FIG. 24 is a top view of the control board of the power control unit of FIG. 20.

Referring now to FIGS. 24 and 25, illustrated are the instrument panels and controls for handling the train and its on-off loading systems. A division is made into 3 sections or areas where the right-hand one-third contains items necessary to operate the train, the center one-third items common to running the train and loading system, while the left one-third comprises items necessary for operating the on-off loading system. Some items in the right one-third concerning operation of the train are self-explanatory while others need further mention. On the far right is the "M SW", the master switch, which should be a keyed item, and if not in the ON position, no controls will respond. Direction is selected by buttons marked 1 and 2 which operate forward-reverse clutches 226 and 228. The transmission controls are push button type, the columns indicating both 1 and 2 for the two main drive trains so that one or the other engine can be run independently or together. "A" indicates automatic shifting while the numbers 4–1 in the columns allow manual selection of ratios. The mode lever provides manual operation of the train while "AUTO" can be selected where the rail system will accommodate automatic running of the train; in this instance, via the keyboard, a destination must be selected. The lever marked "THR" (throttle) operates either or both engines by a fore and aft motion and the air brakes by a lateral motion, which can occur only if the throttle is closed. In addition to the air brakes, which act on all wheels of the entire train in a conventional manner, four other braking systems acting on the power control unit only are provided. Two of these can be utilized with the train in motion and two are parking brakes. In the "TRANS" control are positions labeled "RET" for retard. Selecting these positions applies the engine exhaust restrictors and the transmissions' hydraulic retarders 222. For parking the train when the air brakes and "RET" are ineffective, the "B" position on under "DIRECTION" can be utilized, applying both clutches 226 and 228 per FIG. 23A. The pedal 276 can be "pumped" thus applying the power control unit's friction brakes hydraulically or mechanically as is done in automotive practice. These are released or unlatched by the lever marked "BR REL".

Looking at the center one-third, the TV monitor is a key item. It has a camera or "channel" selector plus a "PIP" (picture in picture) feature so that any two channels can be viewed simultaneously, such as, for example, fore and aft. Since all load-unload positions on the cars, such as 2, are identical, selecting a car and position will connect the monitor's channels to that position. In the upper left of FIG. 25 is a lighted display of containers on-board so that the crew can schedule their disposition plus knowing vacant positions available. Other items are either self-evident or the subjects of prior descriptions.

OPERATION

With all of the FIGS. 1–25 in mind, the present invention operates as described below. The crew of one or more persons is located in the power control unit 2 and operates the train either manually or automatically, which is commonly done in the U.S. and Japan, for example. Optionally, a crew member could operate the train from either end cab 16, but this is considered unusual.

To off- or on-load a container such as 12, the specific position on the train is matched with a corresponding position on a support platform such as 52 or other vehicle such as a truck or train. Once matched, the platform car 4 is maneuvered horizontally and vertically, either by the crew, or preferably, automatically so that a container such as 12 can be transferred. In position, the collapsible arm assemblies 72 and clamps or grippers 84 move the container 12, all of which can be viewed via closed circuit TV camera 44. Again, the crew can actuate the necessary controls, but preferably the entire loading or unloading sequence is handled automatically via a microprocessor or on-board computer. For unloading, the sequence is:

1. Horizontal and vertical lineup of platform car 4 with empty vehicle or platform completed;
2. Anchors 32 released;
3. Arm assemblies 72 extended;
4. Grippers 84 released; and
5. Arms 72 retracted;

For loading, the sequence is as follows:

1. Horizontal and vertical lineup of platform car 4 with loaded vehicle or platform completed.
2. Arms 72 extended, releasing locks, such as 102.
3. Grippers 84 applied.
4. Arms 72 retracted.
5. Anchors 32 engaged.

These simple sequences lend themselves to automatic operation, needing only the push of a button switch for initiation. Problems encountered during loading-unloading can be monitored via the closed circuit TV camera 44, and over-controlling done manually, if necessary.

Cameras 42 are actuated when the loading sequence is completed, or just prior to unloading, and the information stored in the computer of the power control unit so the crew knows the destination of the container 12 and has acquired the information for billing purposes. In addition to the data on the container's placard 40, date, time and location are recorded. During the entire sequence, to facilitate the most efficient method of operation, the following steps must be implemented:

1. Placard 40 read by pickup trucker's reader so that container will go to proper train or platform;
2. During loading, the train's code reader informs the crew of the container's destination so that it can be delivered or transferred;
3. At destination, trucker's reader indicates the final destination so that the door-to-door pickup and delivery is completed;
4. If train can pickup and deliver directly, the trucking or drayage stages are eliminated;
5. Each handler of the container, immediately, upon completion of handling, sends information to a central computer so that when the container is delivered, all information for billing has been obtained; and/or
6. Central computer keeps track of all movements, so tracing at any time is possible by calling up the computer's record of the progress and completion of the shipment.

Via radio, cellular phone or similar means, the crew is in touch with a central computer, dispatchers and other crews in various types of vehicles. In this way, shipments can be tracked and the objectives of rapid, efficient pickup and delivery of containers carried out.

Operating or running the train is different from conventional trains, so the procedure is as follows:

1. Master switch (MSW) to ON and note fuel levels.
2. Call dispatcher, or equivalent, for scheduling and utilize keyboard to enter destination and other pertinent information.
3. Start auxiliary engines to obtain electrical power and fluid pressures.
4. Start main engines (TRANS must be in "N").
5. Select manual or automatic mode of operation, direction of travel, and activate fore and aft TV cameras.

6. Apply service air brakes and release manual brake.
7. If manual mode, select transmission ratio and advance throttle lever which puts train in motion.

Trains are expected to be short (10 cars) and run continuously, stopping only to load, unload or for service. Containers could be owned by the carrier and leased, but preferred arrangement is ownership by the shippers. Platforms and load-unload areas may be provided by Shippers or Municipalities, but could be provided jointly or entirely by the carrier. Truckers or drayage would be run similar to a taxi service, depending upon the area served. Ownership would be either independent or by the carrier. For long distance shipping through lightly or unpopulated areas, a number of the unit trains could be coupled together and run by a single crew. The centrally located power control unit 2 provides ideal propulsion versus presently used locomotives on each end of long trains.

The above description and operation shall not be construed as limiting the ways in which this invention may be practiced but shall be inclusive of many other variations that do not depart from the broad interest and intent of the invention.

What is claimed is:

1. A railway train for rapid automatic loading and unloading of at least one cargo container, comprising:

at least one bi-directional power control unit for providing motive power to and coordinating the cargo container loading and unloading operations of the railway train;

at least one platform car operatively coupled to said control unit, said platform car defining a generally planar upper surface for accommodating said cargo container;

at least one extensible arm assembly attached to said platform car and including at least two clamp members connected thereto which are releasably engagable to opposed sides of said cargo container; and a drive motor electrically interfaced to said control unit and coupled to said arm assembly for facilitating the extension and retraction thereof, said arm assembly being selectively retractable for purposes of drawing said cargo container laterally onto said upper surface, and extensible for purposes of dispensing said cargo container laterally from said upper surface.

2. The railway train of claim 1 wherein said platform car defines a rectangular platform surface including a pair of longitudinally opposed side edges and wherein said at least one extensible arm assembly may be extended or retracted laterally relative to either of said side edges.

3. The railway train of claim 1 further comprising at least one end cab operatively coupled to said platform car, said end cab including an on-board camera in electrical communication with said control unit for relaying visual images to said control unit.

4. The railway train of claim 3 wherein said train includes a pair of platform cars operatively coupled to opposed ends of the power control unit which is centrally positioned therebetween, each of said platform cars having an end cab operatively coupled to the end thereof opposite that coupled to the control unit.

5. The railway train of claim 4 wherein said platform cars are operatively coupled to said control unit and said end cabs via slackless couplers.

6. The railway train of claim 3 wherein said train comprises a plurality of platform cars operatively coupled to each of the opposed ends of said control unit, each of the two distal-most platform cars having an end cab operatively coupled thereto.

7. The railway train of claim 5 wherein said platform cars are operatively coupled to said control unit, said end cabs and each other via slackless couplers.

8. The railway train of claim 1 wherein the upper surface of said platform car includes rollers for aiding in the lateral loading of said cargo container thereonto, and lateral unloading of said cargo container therefrom.

9. The railway train of claim 8 wherein said rollers comprise non-swivel castors.

10. The railway train of claim 1 wherein said at least one cargo container includes an identification placard disposed thereon, and said platform car includes at least one visual scanning device in electrical communication with said control unit for relaying data from said identification placard to said control unit when the cargo container is loaded onto the upper surface.

11. The railway train of claim 1 wherein said platform car includes at least one camera in electrical communication with said control unit for relaying to the control unit visual images of activity associated with the automatic loading and unloading of the cargo container onto and from the platform car.

12. The railway train of claim 1 wherein said cargo container includes a first electrical connector and said platform car includes a second electrical connector which is adapted to be releasably couplable to said first electrical connector when said cargo container is positioned upon the upper surface of said platform car.

13. The railway train of claim 1 wherein said platform car includes an adjustable suspension system in electrical communication with said control unit for selectively adjusting the elevation of the upper surface relative to an adjacent loading/unloading platform.

14. The railway train of claim 13 wherein said platform car includes at least one sensor in electrical communication with said control unit in order to manipulate the suspension system to facilitate leveling, vertical adjustment and horizontal alignment of the upper surface of the platform car with the adjacent loading/unloading platform.

15. The railway train of claim 14 wherein said suspension system is further adapted to selectively adjust the longitudinal positioning of the upper surface, and said at least one sensor is further adapted to facilitate the adjustment of the suspension system in a manner longitudinally aligning the upper surface of the platform car with the adjacent loading/unloading platform.

16. The railway train of claim 15 wherein said control unit includes an on-board programmable microprocessor in electrical communication with said adjustable suspension system, sensor and extensible arm assembly for coordinating the cargo container loading and unloading operations of the railway train.

17. The railway train of claim 1 wherein said platform car further comprises cargo container anchors disposed on the upper surface thereof for releasably securing the cargo container to the upper surface during transport.

18. The railway train of claim 1 wherein said control unit includes a dual drive train for providing redundancy in the event of an individual drive train failure and increasing tractive effort.

19. The railway train of claim 1 wherein said bi-directional power control unit includes a unique drive train consisting of:

an engine operatively interconnected to a hydraulic torque converter, said hydraulic torque converter being interconnected to a hydraulic retarder, said hydraulic retarder being interconnected to a multi-speed power shifting automatic transmission, said transmission being interconnected to a power shifter, said power shifter being interconnected to a forward-reverse gearbox, said gearbox being interconnected to a first angle drive, said first angle drive being interconnected to a driven shaft equipped with sliding joints and universal joints, said sliding and universal joints being interconnected to a second angle drive, and said second angle drive being interconnected to a final drive gearing which is operatively coupled to an axle shaft having wheels attached thereto.

20. The railway train of claim 1 wherein said control unit includes a pair of engine-driven generators to provide required electrical power for operation of the railway train.

21. The railway train of claim 1 wherein said control unit further comprises a heavy-duty starter motor for propelling the train a short distance in a controlled manner.

22. The railway train of claim 1 wherein said control unit includes an on-board recording device for documenting the train's movement, the loading and unloading sequences of cargo containers and the tracking of cargo containers to facilitate the billing of customers.

23. The railway train claim 1 further comprising:

an adjacent horizontal support platform having a generally planar surface incorporating rollers for a facilitating lateral movement of cargo containers;

locking device having a locked and unlocked position wherein the locked position restrains cargo container movement and is responsive to unlocking when interfaced with the extensible arm of a platform car; and an electrical connector incorporated into the support platform surface for mating with electrical connectors of a cargo container when the cargo container is in a locked position upon the support platform surface to supply electrical power to the cargo container.

24. The railway train of claim 23 wherein said adjacent horizontal support platform is supported by a truck.

25. The railway train of claim 23 wherein said adjacent horizontal support platform is supported by a railway car.

26. The railway train of claim 23 wherein said adjacent horizontal support platform is supported by a stationary support structure.

27. The railway train of claim 1 wherein said bi-directional power control unit includes a dual drive train for use as either a redundant system or for doubling tractive effort.

28. The railway train of claim 1 wherein said bi-directional power control unit includes at least one separate engine-driven generator to provide required electrical power to the railway train.

29. The railway train of claim 1 wherein said power control unit further comprises a heavy duty starter motor capable of moving the train a short distance in a controlled manner for purposes of aligning the platform car for loading and unloading of cargo.

30. The railway train of claim 1 wherein the bi-directional power control unit further includes a means for remote control of the loading and unloading of cargo containers to and from the platform car.

31. The railway train of claim 1 further comprising a train braking system including:

a power control unit braking system comprising a parking brake component for use when the train is at rest and a retard brake component when the train is in motion; and an air braking system.

32. The railway train of claim 1 further comprising a train braking system including:

an air braking system;

a retard braking system comprising:

hydraulic retarders; and engine exhaust restricters;

a parking braking system comprising:

clutches; and friction brakes.

33. The railway train of claim 32 wherein said friction brake may be applied manually.

34. The railway train of claim 32 wherein said parking brake system additionally includes a parking lock mechanism which is activated by spring applied clutches in a forward-reverse gearbox.

* * * * *